May 26, 1970     M. E. RABEDEAU     3,514,183

LIGHT DEFLECTOR SYSTEM

Filed Nov. 6, 1967     2 Sheets-Sheet 1

*INVENTOR*
MELBOURNE E. RABEDEAU

BY Gerald L. Moore

ATTORNEY

United States Patent Office 3,514,183
Patented May 26, 1970

3,514,183
LIGHT DEFLECTOR SYSTEM
Melbourne E. Rabedeau, Saratoga, Calif., assignor to International Business Machines Corporation, Armonk, N.Y., a corporation of New York
Filed Nov. 6, 1967, Ser. No. 680,805
Int. Cl. G02f 1/28
U.S. Cl. 350—160          21 Claims

ABSTRACT OF THE DISCLOSURE

A light deflector system is provided wherein a light beam can be positioned in response to electrical signals, thereby to enable the quick and precise positioning of the beam to preselected locations.

BACKGROUND OF THE INVENTION

Field of the invention

This invention relates to light deflectors in general, and more particularly to light deflectors specifically adapted to digitally deflect or focus the beam selectively along preselected paths. While not limited to this use, the invention is particularly adapted for digitally offsetting a light beam along spaced parallel paths so that it can be focussed on a memory element to record or read information on the element.

Thus, the primary object of this invention is to regulate the positioning of a light beam in an improved manner and in response to electrical signals.

A further object of this invention is to adjust quickly the positioning of a light beam with a minimum loss of beam intensity.

Still another object of this invention is to deflect a light beam while maintaining the beam focussed in a predetermined plane.

Another object of this invention is to maintain a beam in a predetermined focussed condition in response to an electrical controlling signal.

Summary of the invention

A light deflector for controlling the position of a light beam comprising a first light transparent member for receiving the beam and having an external surface positioned to intercept said beam at an angle exceeding the critical angle and reflect it back into said member by the principle of total internal reflection, with a second member movably positioned to abut said first member reflecting surface such that, when in abutting relationship with the first member, the light will pass on into the second member and be reflected by a reflecting surface of the second member back into the first member, thereby to offset the path of said beam a predetermined distance.

The foregoing and other features and the advantages of the invention will be apparent from the following more particular description of the preferred embodiments of the invention, as illustrated in the accompanying drawings.

DESCRIPTION OF THE PREFERRED EMBODIMENTS

The principle of total internal reflection is well know in optics wherein almost total reflection of a light bear occurs when the beam being transmitted within a mate rial having a higher index of refraction is intercepted b an external surface which is adjacent a material having lower index of refraction. So long as the angle of in cidence of the light rays approaching the surface exceed the critical angle, total reflection at the surface will t achieved. For instance, with an ordinary right angle prisr surrounded by air, light entering one of the two rigl angle faces is reflected almost totally when it reache the surface of the hypotenuse face. It is also known tha this principle applies provided there is a film of air c a vacuum adjacent to the hypotenuse surface which approximately two wavelengths thick regardless of wh; material is located beyond the film. However, when glass plate is brought into abutting relationship with tt hypotenuse surface (thereby substituting the glass fc the air as the adjacent medium), the index of refractic of the two surfaces becomes more nearly the same ar the light approaching the hypotenuse surface from tt internal side of the prism will pass on into the secor glass plate. This principle is applied in the U.S. Pat. N 2,997,922 entitled, "Light Valve," which issued Aug. 2 1961, with Edward K. Kaprelian as inventor. In th patent, a light valve is constructed wherein light wi either be reflected back into the prism by the intern reflection of the hypotenuse face or, with a glass pla being brought into contact with the face, will pass o through the second glass plate in a direction away fro: the prism.

Figure 1:
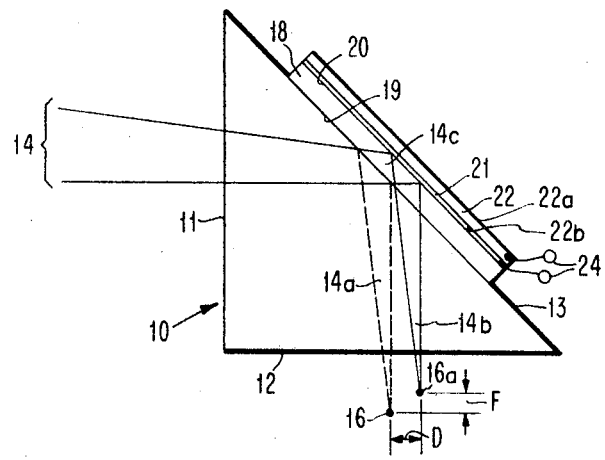
FIG. 1 shows a single stage light deflector embodying the subject invention.
Figure 2:
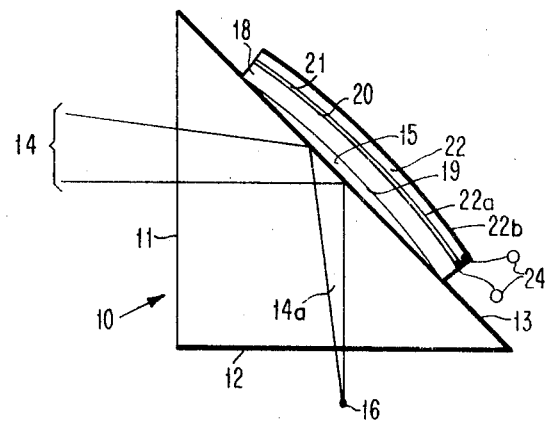
FIG. 2 shows the deflector of FIG. 1 activated to a second state.

In FIG. 1 is shown an embodiment of the inventic employing the total internal reflectance principle where a first light transparent member in the form of a rig angle prism 10 having right angle surfaces 11 and 12 ar a hypotenuse surface 13 is positioned to receive a lig beam 14 through the face 11. As shown in FIG. 2 ar described in the prior art, the light beam 14 will i reflected off the hypotenuse surface 13 if air or son other material having an index of refraction substantial lower than that of the prism is present in the space : external to the hypotenuse surface where the beam strik( In the example to be described, the prism is surround( by air or vacuum. However, it should be realized th other materials of different refractive indexes could used. Thus, in the absence of other circumstances, t beam will be reflected almost totally along a first pa 14a (FIGS. 1 and 2) through the prism to result in t beam being focussed at a focal point 16. The reflection the beam is due to the principle of total internal refl( tion just described which occurs because the angle which the light strikes the surface exceeds the critic angle for the prism material.

Positioned external to the hypotenuse surface 13 the prism is a second light transparent member in t form of a light reflecting plate 18 which contacts t hypotenuse surface at the point of intersection with t light beam 14. With the surface 19 of the glass plate in contact with the hypotenuse surface of the prism, 1 index of refraction external to the hypotenuse surface not substantially lower than the index of refraction the prism and the effect of the total internal reflecti principle is negated. Thus, the beam passes external the right angle prism along the path 14c shown in FIG.

In accordance with one primary feature of the inv( tion, a light deflector is provided wherein the surface the glass plate 18 is made reflective so that when the beam 14 reaches this surface, it is reflected back along the path 14d. As indicated in FIG. 1, this reflection of the beam makes it possible to digitally offset the path of the beam a distance D by the actuation of the plate 18. The reflecting surface 20 can be formed by coating the surface with a reflective coating 21, as shown in the drawings. In the alternative, the total internal reflection of light principle can be utilized by the proper alignment of the surface 20 relative to the beam at the point of intersection such that the beam is reflected along the path 14d when intersecting the surface. Since total internal reflection requires not only the proper angular relationships between surface and the beam, but as mentioned above, a sufficient difference in the index of refraction of the material abutting the reflecting surface, the piezoelectric element 22, discussed below, or other material contacting surface 20 must be of such sufficient difference in index of refraction, a sufficiently lower index of refraction, if such internal reflection is to occur.

In FIG. 1, it can be seen that the beam is reflected back along the path 14d, and, because of the similar indices of refraction of the plate 18 and right angle prism 10, the light will again pass from the prism out of the surface 12 (since the angle of the beam is less than the critical angle) to be focussed at a point 16a external to the prism. Thus, the position of the beam is shown as being offset from the original path 14a by a distance D, which distance is a function of the length of the light beam path as the beam passes between the prism hypotenuse surface 13 and reflecting surface 20 of the glass plate 18. By varying the thickness of the glass plate 18, the distance D can be changed. From the foregoing, it is apparent that by movement of that portion of the glass plate 18 adjacent the point of intersection between the light beam 14 and the hypotenuse surface 13 away from the hypotenuse surface by a distance approximating one wavelength or more, the beam will be reflected along the path 14a. Actuation of the glass plate 18 until it contacts the hypotenuse surface 13 at the point of intersection with the beam 14 will cause the beam to pass on into the glass plate and thereafter be reflected along the path 14d by the reflecting surface 20, as shown in the drawings.

In accordance with another feature of the invention, the plate 18 is actuated from a position abutting the hypotenuse face of the right angle prism 10 to a position spaced therefrom in response to an electric signal serving to energize a piezoelectric element 22 fixed to the reflecting side of the plate 18. The reflecting side of the plate 18 is that side opposite the side which abuts the hypotenuse face 13 of the right angle prism. As is well known, the characteristic of such a piezoelectric element is to expand when being exposed to a voltage potential between the faces 22a and 22b thereof to which the terminals 24 are attached. The resulting differential extension of the element relative to the plate in a direction parallel to the reflecting surface of the plate 18, because the element is fixed firmly to the reflecting surface of the plate, will bow the plate away from the surface 13 in the manner illustrated in exaggerated manner FIG. 2. This bowing action will cause the center section of the plate to move away from that portion of the hypotenuse surface which intercepts the beam 14. It has been found that the application of just a few hundred volts potential across the terminals 24 will cause a movement of the center portion of the plate 18 as much as several microns away from the hypotenuse surface, with the actual distance of movement depending upon the overall size of the plate and element.

The actuating time for the plate is only a few microseconds since the piezoelectric element reacts quickly. Thus, the switching of the beam is substantially instantaneous. With the movement of the plate 18 between the position indicated in FIG. 1 and the position indicated in FIG. 2, the beam reflection path will shift from that shown as 14d to that shown as 14a. In this manner, the position of the beam is digitally offset in quick response to the receipt of an electrical voltage signal at the terminals 24.

To speed the activating time and in accordance with another feature of the invention, it is preferable to evacuate at least partially the space between the plate 18 and the prism 10. Experience has shown that the presence of air within this space greatly slows the movement of the plate back into contact with the face 13 since the air therebetween must escape before contact between the surfaces can occur. Evacuation of the air permits the surfaces to come together quickly since such action is further aided by the molecular attraction of the glass material. Additionally, to speed movement of the plate into contact with the prisms, a reverse voltage can be applied between the element faces 22a and 22b for causing the element to contract more quickly to drive the plate back to the "unbowed" condition shown in FIG. 1.

Figure 3:
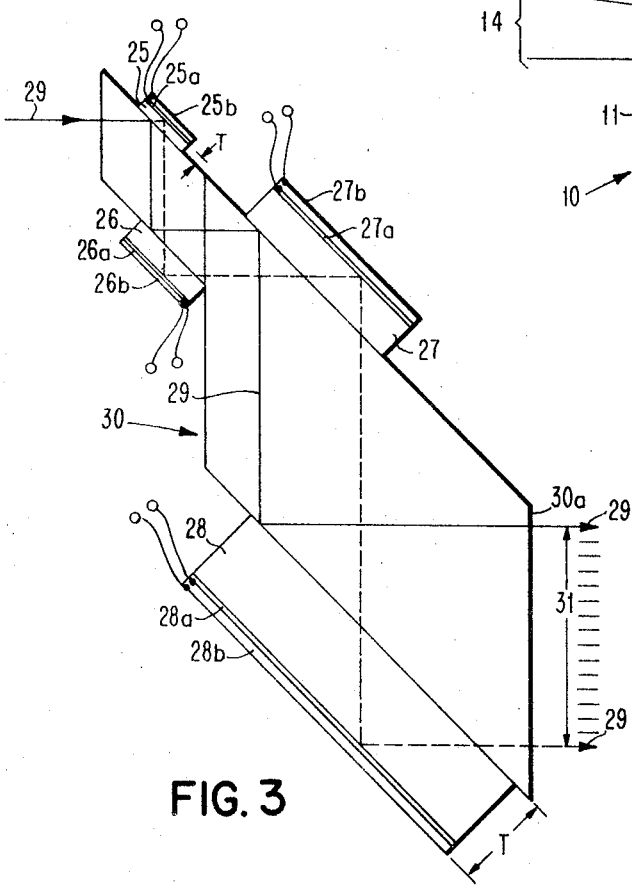
FIG. 3 shows a multiple stage deflector embodying the present invention.

A second embodiment of the invention is shown in FIG. 3 wherein the beam can be selectively positioned at either of sixteen positions. Herein, the beam 29 is passed through a prism 30 having a series of plates 25, 26, 27, and 28 positioned along those external surfaces normally intersecting the beam 29 as it is reflected within the prism. Each of the plates, respectively, includes a reflecting surface 25a, 26a, 27a, and 28a on the flat side opposite the side abutting the prism face to which also is affixed, respectively, a piezoelectric element 25b, 26b, 27b, and 28b. Thus, as shown by the solid and dotted line positions of the beam 29, the use of four reflecting plates positioned on the points of intersection between the surface of the prism and the beam will provide the capability of offsetting the beam at any of sixteen positions (or a total distance 31) where it exits the prism through the face 30a.

By individually and collecively energizing the combinations of reflecting plates either to permit the beam to be reflected from the surface of the prism or from the adjacent reflecting surface of each of the plates, the beam also can be selectively positioned at the sixteen positions within the distance 31. Each distance the beam is offset is a function of the thickness T of each reflecting plate and for this purpose, each plate is constructed having a thickness greater than the next thinner plate so the length of the light path from the abutting surface of the prism to the reflecting surface is greater by a multiple such as two than that of the next thinner plate. In this manner, an equal digital spacing between the exiting beam positions can be achieved with a minimum number of plates. Naturally, the actuation of these plates can be by any suitable means; however, that method described in conjunction with FIGS. 1 and 2 utilizing piezoelectric elements has been found to be the preferable system. The total number of positions to which the beam can be deflected is calculated by the formula $2^n$ where $n$ is the number of individually actuatable reflecting plates positioned to intercept the beam at the surfaces of the prism. Also, while the deflection of the beam in the drawings is in one plane only, a similar controlled deflection of the beam can be achieved in other planes by the proper positioning of the prism surfaces that intersect the beam.

Figure 4:
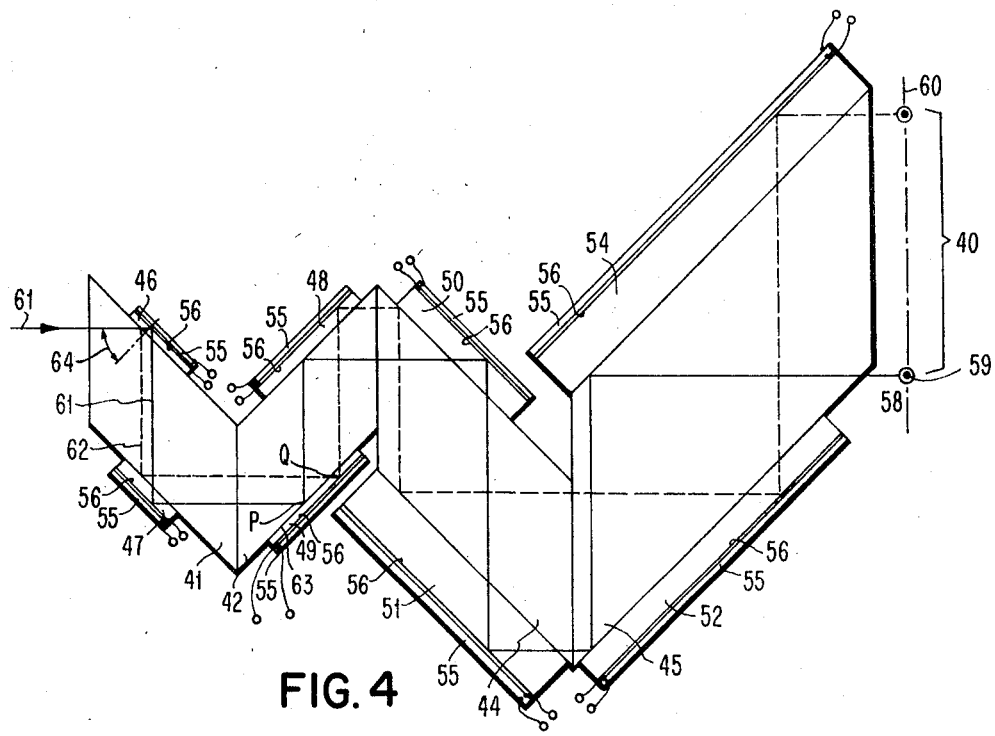
FIG. 4 shows a multiple stage deflector embodying the present invention wherein the light path lengths are maintained equal.

In FIG. 4 is shown a further embodiment of the invention wherein, in accordance with another feature of the invention, the beam can be digitally deflected with the beam path length remaining the same for each exiting beam position spaced along the total deflecting distance 40. As is shown in the embodiment of the invention of FIG. 1, the position of the focus point of the beam varies the distance F for a one stage deflector depending on the thickness of the reflecting plate since the beam path through the transparent medium is elongated if the beam enters the reflecting plate. For instance, in FIG. 1 the focal points 16 and 16a vary by the distance F measured in the direction normal to the prism face 12 as the path position of the beam is changed. To equalize the path lengths, a plurality of parallelogram prisms 41, 42, 44, and 45 (FIG. 4) cooperate in the same way as the prisms of FIG. 3 to provide a central beam path. Each of the prisms has associated therewith a plurality of reflecting plates 46, 47, 48, 49, 50, 51, 52, and 54 as shown. To each of these reflecting plates is affixed a reflecting surface 56 and an actuator in the form of a piezoelectric element 55. Thus, the plates are actuated into and out of contact with the adjacent prism face in the same manner as heretofore described.

In accordance with this feature of the invention, the reflecting plates are paired in equal beam path length therethrough. For instance in the embodiment shown in FIG. 4, the plates 46 and 49 have the same thickness as do the plates 47 and 48, 50 and 52, 51 and 54. The energization of each of the plates of a pair is effected alternately; that is, when the plate 46 is energized to the second position abutting the prism face, the plate 49 is energized to the first position spaced from the prism face. The plates and prisms are arranged such that as one is actuated to increase the path length, the other of the pair is actuated to decrease the path length an equal amount. Thus, the beam 61 which is deflected by the first plate of the pair of plates 46, 49 intersects the prism surface 63 to which the second glass plate of the pair is attached at a point P which is in advance of the point Q at which the undeflected beam 62 intersects the prism surface 63. This geometrical requirement is achieved by placing the two plates of a pair on the prism reflecting surfaces which are angularly separated by twice the angle of incidence 64 of the beam on the prism surface to which the first plate is attached. With the deflected beam reflected by the prism surface at P in advance of the intersecting point, Q, of the undeflected beam, and with the undeflected beam entering the second plate of the pair and being reflected at the back surface of the plate, the lateral separation of the beam is double that produced by the first plate only. Thus, the beam in passing through the system will travel always through only one of a pair of plates, having an equal beam path length. While the plates are shown as being of equal thickness, it is necessary only that the beam path length therethrough be equal. For instance more than two plates can be actuated alternately to achieve the same results, so long as the path length through each of the alternately actuated sets is equal.

The equal path length results in the example shown, because as one plate of the pair is moved to abut the hypotenuse face of the central prism thereby to increase the path length of the beam, the other equal thickness plate is moved away from its cooperating hypotenuse face to reduce the path length by an amount equal to this increase. Thus, the focus points 59 always lie within the plane 60 after such focussing is once achieved, which plane can correspond to the position of a memory element or other target on which the beam is being directed. Of course, by actuating the two plates in pairs, the distance the beam path is offset is double that normally effected by the actuation of one plate of a thickness of each of these plates.

Figure 5:
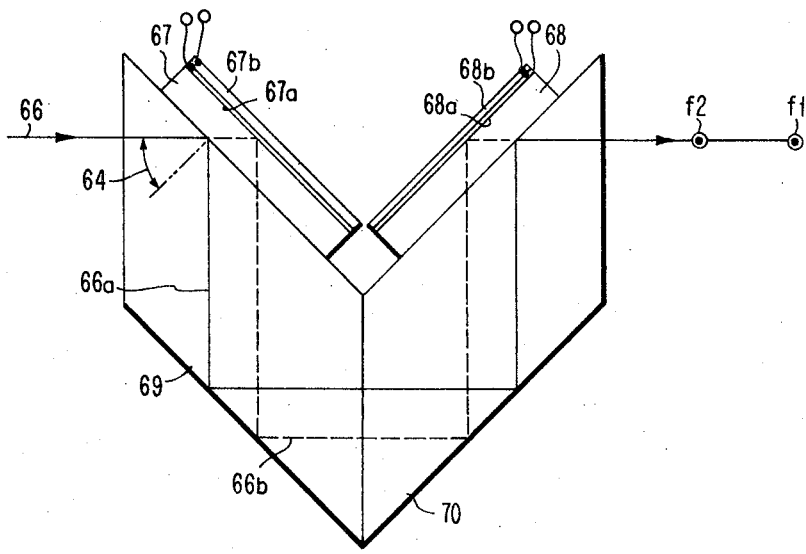
FIG. 5 shows a beam focussing mechanism which act in response to an electric input signal.

Still another embodiment of the invention is shown in FIG. 5 wherein the focus point of the beam 66 can be shifted between the points $f1$ and $f2$ by combining means for changing the path length of the beam through a transmitting medium. This is achieved in the example shown by actuation of the reflecting plates 67 and 68 positioned adjacent the prisms 69 and 70, respectively. The focus point for the beam is changed by altering the path length within the transparent transmitting mediums, i.e., the prisms 69 and 70, in a manner such that the beam always is transmitted away from the last reflecting surface of the prism along the same path to exit the prism 70 at the same place. The reflecting plates 67 and 68 each include respectively a reflecting surface 67a and 68a along with a piezoelectric element 67b and 68b attached and functioning in the same manner as described in the previous embodiments to reflect the beam. By applying a voltage potential across the elements, the plates can be caused to bow away from the prisms 69 and 70 at the point of impingement of the beam, respectively, to alter concurrently the path of the beam. The reflecting plates can be actuated in groups of any numbered plates to change the beam path length and maintain the beam positioned along the same exit path.

For example, with both the plates 67 and 68 positioned away from the adjacent prism surfaces, the beam will follow the solid line path 66a through the prisms 69 and 70 and be focused at the focal point $f1$. However, with the plates 67 and 68 in contact with the adjacent prism surfaces, the beam will enter the plates and pass along the dotted line 66b to be focused at the focal point $f2$. In either instance, the beam is controlled to exit the prism along the same path yet be focused at a different point along the path. Naturally, more focussing points can be obtained by the addition of other prisms and reflecting plates. In this manner, focussing of the beam is achieved responsive to the electrical signal supplied to the piezoelectric elements on the reflecting plates.

While the invention has been particularly shown and described with reference to preferred embodiments thereof, it will be understood by those skilled in the art that various changes in the form and details may be made therein without departing from the spirit and scope of the invention.

What is claimed is:

1. A light deflector for controlling the position of light beam, comprising:
   a first light transparent member for transmitting a light beam to be deflected and having an external surface positioned to intercept said beam at an angle of incidence exceeding the critical angle thereby to reflect it back into said member by the principle of total internal reflection along a first path;
   a second light transparent member movable between first position spaced from the point of impingement of the beam on said first member surface to a second position abutting said external surface of said first member;
   said second member having an index of refraction of value sufficient to cause said light beam to enter said second member when said members are abutting;
   said second member also having a reflecting surface positioned to intercept said light beam entering said second member for reflecting the beam back toward the first member along a second path spaced relative to the first path; and
   means for actuating said second member between said first and second positions to switch the position of said beam between said first and second paths.

2. A light deflector as defined in claim 1 wherein said first light transparent member is a prism.

3. A light deflector as defined in claim 1 wherein said second light transparent member includes a reflective coating positioned to intercept said light beam after enters said second member.

4. A light deflector as defined in claim 1 including means for drawing at least a partial vacuum in the space between said first and second members to permit the quick actuation of said members into abutting relationship.

5. A light deflector as defined in claim 1 wherein said actuating means is electrically energized.

6. A light deflector as defined in claim 5 wherein said actuating means comprises a piezoelectric element fixed to said second member, which element when energized by applying a voltage thereacross will expand and bow said second member relative to said first member thereby separating said abutting surfaces at the point of intersection with the light beam.

7. A light deflector as defined in claim 1 wherein said second member reflecting surface is positioned to intercept the light beam entering said second member at an angle of incidence exceeding the critical angle thereby serving to reflect said beam along said second path by the principle of total internal reflection.

8. A light deflector as defined in claim 1 wherein said second member comprises a thin plate of glass having said reflecting surface substantially parallel to said surface abutting said first member.

9. A light deflector as defined in claim 8 wherein said actuating means comprises a piezoelectric element attached to portions of said reflecting surface with means to apply a voltage potential across said element and cause said element to expand thereby to bow said plate of glass relative to said first member external surface for moving said second member in a first direction relative to the first member.

10. A light deflector as defined in claim 9 wherein a reverse voltage also is applied across said element for moving said second member in a second direction relative to the first member.

11. A light deflector for controlling the position of a light beam, comprising:
 a first transparent member for transmitting said light beam;
 said first member having a plurality of surfaces for intercepting said light beam in sequence and at an angle of incidence exceeding the critical angle thereby to reflect the beam by the principle of total internal reflection back away from a first one of the surfaces along a first path through said member and towards a second surface;
 a second light transparent member for each of said first member intercepting surfaces held for movement from a first position spaced from the point of impingement of the beam on said adjacent surface to a second position abutting said intercepting surface;
 each said second light transparent members having an index of refraction of a value sufficient to cause said light to enter said second member when said member is in the second position abutting said first member surface;
 said second members also having a reflecting surface positioned to intercept said light beam entering said second member for deflecting the beam back into said first member along a second path spaced from said first path; and
 means for actuating said second members between said first and second positions thereby to switch the position of said beam to any one of a number of preselected paths.

12. A light deflector as defined in claim 11 wherein said first transparent member is a prism.

13. A light deflector as defined in claim 11 wherein the space between the abutting surfaces of said first and second members is at least partially evacuated to permit quick movement of the second member towards said first member.

14. A light deflector as defined in claim 11 wherein at least one of said second light transparent members is constructed with said reflecting surface positioned to intercept the light beam passing into said second member at an angle of incidence exceeding the critical angle thereby serving to reflect the beam back along the second path by the principle of total internal reflection.

15. A light deflector as defined in claim 11 wherein at least one of said actuating means comprises a piezoelectric element fixed to said second light transparent member, and means for applying a first electric potential across said element thereby to cause said element to expand and apply a force to said second member for causing said member to move relative to said first member.

16. A light deflector as defined in claim 15 wherein said piezoelectric element when energized by the electric potential expands to bow said second member and move a portion thereof relative to the first member surface which intercepts the light beam.

17. A light deflector as defined in claim 16 including means for applying a reverse electric potential in relation to the first electric potential to move a portion of the second member in a second direction relative to the first member.

18. A light deflector as defined in claim 11 wherein the second light transparent members are each paired with another such member held adjacent another of the light intercepting surfaces of the first member along the path of said light beam for rotating the beam in a direction opposite to the paired first member and with each pair of members being constructed with the same distance for the light to travel between the first member abutting surface and the reflecting surface of the second member; and
 the said means for actuating said members are energized to move said members of each pair alternately such that as one plate is moved to increase the path length the other is moved thereby to decrease the path length by an equal amount always to equalize the light path length through the deflector.

19. A light deflector as defined in claim 18 wherein a piezoelectric element is fixed to each second member reflecting surface and including means to apply selectively an electric potential to each said element thereby serving to apply a tensile force to second member to move at least a portion of said second member relative to the first member surface at the point of interception with the light beam.

20. A light deflector as defined in claim 11 wherein the length of the light path in each of the second light transparent members measured between the first member abutting surface and the reflecting surface is a multiple of the path of another second member thereby reducing the number of members necessary to deflect the beam by equal incremental distances between the separate light paths.

21. A light deflector as defined in claim 11 wherein the length of the light path in each of the second light transparent members measured between the first member abutting surface and the reflecting surface is greater by a multiple of two than that of the next thinner plate thereby to achieve equal digital spacing between the separate light paths.

References Cited

UNITED STATES PATENTS 3,443,098  5/1969  Lewis.

OTHER REFERENCES

"Fast Light Deflector Brings Laser Computer a Bit Closer"—Laser Focus—vol. 5, No. 7, April 1969.

"Total Internal Reflection Light Deflector," by M. A. Habegger et al., Applied Optics, vol. 5, No. 9, September 1966.

RONALD L. WIBERT, Primary Examiner

P. K. GODWIN, Jr., Assistant Examiner

U.S. Cl. X.R.

350—285, 286, 288, 299